Patented Mar. 2, 1937

2,072,226

UNITED STATES PATENT OFFICE 2,072,226

MATERIAL FOR COMBATING PESTS

Paul Stricker, Monthey, Switzerland, assignor to the firm of Society of Chemical Industry in Basle, Basel, Switzerland No Drawing. Application July 22, 1935, Serial No. 32,636. In Switzerland August 14, 1934

1 Claim. (Cl. 167—35)

It is known that hydrocyanic acid is a useful agent for combating various pests. Its use in liquid form, however, is dangerous because the liquid is liable to decompose and to give rise to explosions. On this account liquid hydrocyanic acid must be stabilized by an agent, such as oxalic acid. In order to avoid the inconvenience of having to transport liquid hydrocyanic acid, which has a low boiling point, the expedient has been adopted of absorbing the hydrocyanic acid by materials presenting a large surface such as kieselguhr, asbestos and active carbon, the vapour being allowed to issue from the absorbent at the place of use. However, in the absorbed form the stability of the hydrocyanic acid is not certain and even in this case a stabilizing agent must be added. It has been proposed to use active carbon of an acid nature, for instance carbon that has been pretreated with a liquid acid or an acid vapour, for stabilizing hydrocyanic acid. Such an active carbon should enhance the stability of hydrocyanic acid.

By another proposal material containing cellulose is pre-treated with an acid or salt of acid action and then saturated with hydrocyanic acid.

The present invention is based on the observation that peat affords an outstanding naturally occurring material of large surface which absorbs hydrocyanic acid in large quantities and at the same time stabilizes the acid. Peat has the particular advantage that in addition to a mechanical it has also a chemical stabilizing effect so that the usual additions for preserving the hydrocyanic acid, such as oxalic acid, sulfuric acid or sulfurous acid, which are liable to attack the sheet metal containers, are not necessary. Since the peat containing hydrocyanic acid gives up the acid on exposure to air it is suitable in an advantageous manner for combating pests of all kinds.

Various kinds of peat may be used for absorbing the hydrocyanic acid and in particular the highly porous more recently formed sphagnum peat. The peat can be used in the form of sods or, if preferable in individual cases, in a comminuted form, for instance in the form of grains, fibres, straw or powder. With a content of 50 per cent of hydrocyanic acid the product has a dry appearance; when the proportion is about 70 per cent the supporting material has a more or less wet appearance, but the hydrocyanic acid is still completely retained by the peat. In comparison a burnt kieselguhr yields only products with a content of about 40 per cent of hydrocyanic acid if the danger is to be avoided that a part of the liquid HCN separates again from the absorbing agent in the containers in the course of transport and storage. The peat may be compressed into any suitable moulded pieces.

The products obtained part completely with the hydrocyanic acid on exposure to air and there remains a non-poisonous residue which can easily be disposed of or be used again. The speed with which the hydrocyanic acid dissipates can be controlled by the size of the moulded mass, since, obviously, the hydrocyanic acid in the interior of a large moulded mass is evolved comparatively slowly.

Added to the particularly favorable property of the peat as a naturally occurring stabilizing agent for hydrocyanic acid which requires no chemical pre-treatment and no stabilizing addition and does not attack the packing material, the peat has a particular advantage in that its accessibility is unlimited and that it is extraordinarily cheap.

The new products may contain in known manner the usual substances indicating their poisonous nature, such as for instance chloropicrin, cyanogen halides chlorocarbonicalkylesters, and the like.

What I claim is:—

A pest-combating agent comprising peat having hydrocyanic acid absorbed thereon.

PAUL STRICKER.